Figure 1:
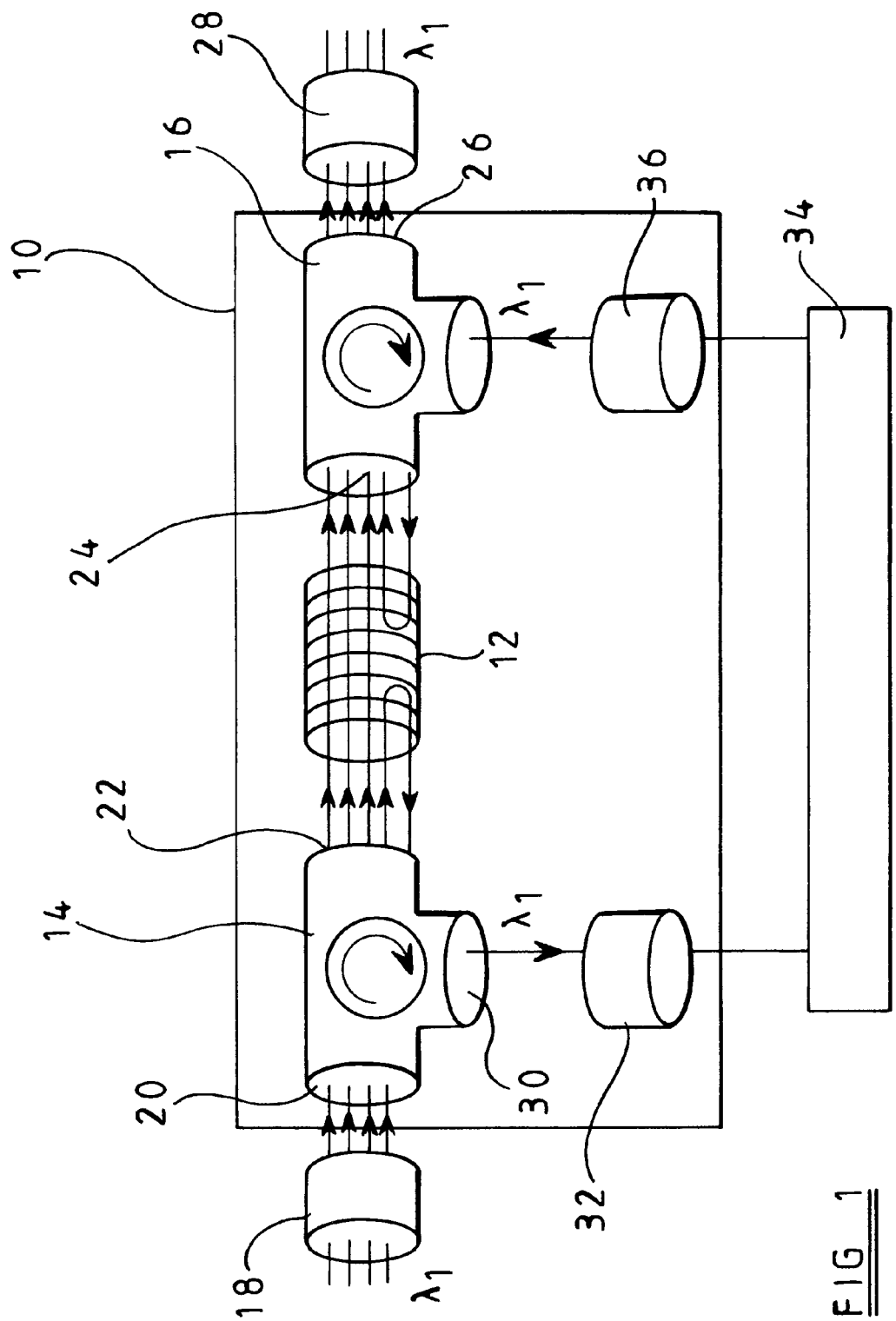

United States Patent [19]
Watson et al.

[11] Patent Number: 6,115,516
[45] Date of Patent: Sep. 5, 2000

[54] WAVELENGTH DIVISION MULTIPLEX BRANCHING UNIT AND METHOD OF OPERATION FOR OPTICAL TRANSMISSION SYSTEMS

[75] Inventors: Ian Gerard Watson, Essex; Alan Raymond Crameri, Morecambe Lancs; Thomas John DeFoe, Hertfordshire, all of United Kingdom

[73] Assignee: Alcatel, Paris, France

[21] Appl. No.: 09/075,775

[22] Filed: May 11, 1998

[51] Int. Cl.$^7$ .................................................. G02B 6/28
[52] U.S. Cl. ........................ 385/24; 385/37; 385/31; 385/46; 385/47; 385/147
[58] Field of Search .............................. 385/14–24, 27, 385/31, 37, 39–48, 147; 359/119, 110, 134, 160, 179, 173

[56] References Cited

U.S. PATENT DOCUMENTS 5,185,814 2/1993 Healey ........................................ 385/24

*Primary Examiner*—Phan T. H. Palmer
*Attorney, Agent, or Firm*—Ware, Fressola, Van Der Sluys & Adolphson LLP

[57] ABSTRACT

A wavelength division multiplex branching unit for an optical fibre transmission network comprises a branching unit housing (100) and means (102) external to the housing for permitting the connection of one or more wavelength selective devices (A, B, C, D) to a trunk transmission fibre. The wavelength selective devices are each responsive to a different transmission wavelength and are effective to direct transmission signals have that response wavelength from the trunk fibre to a spur fibre of the branch cable.

30 Claims, 7 Drawing Sheets

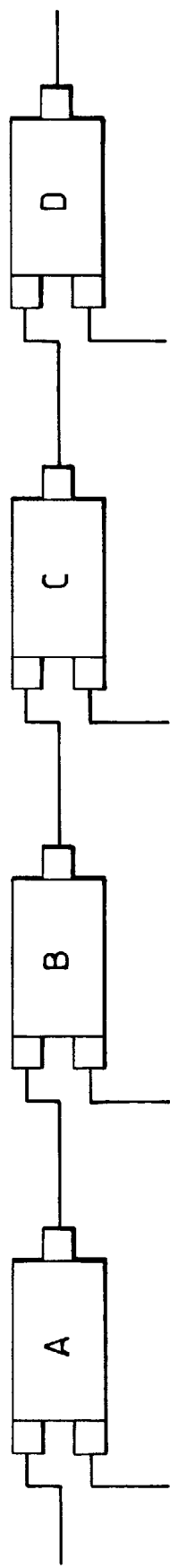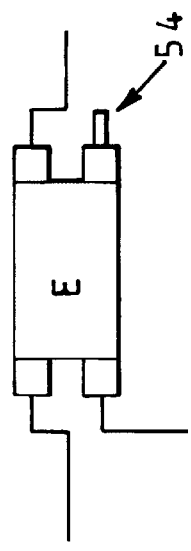
FIG 4

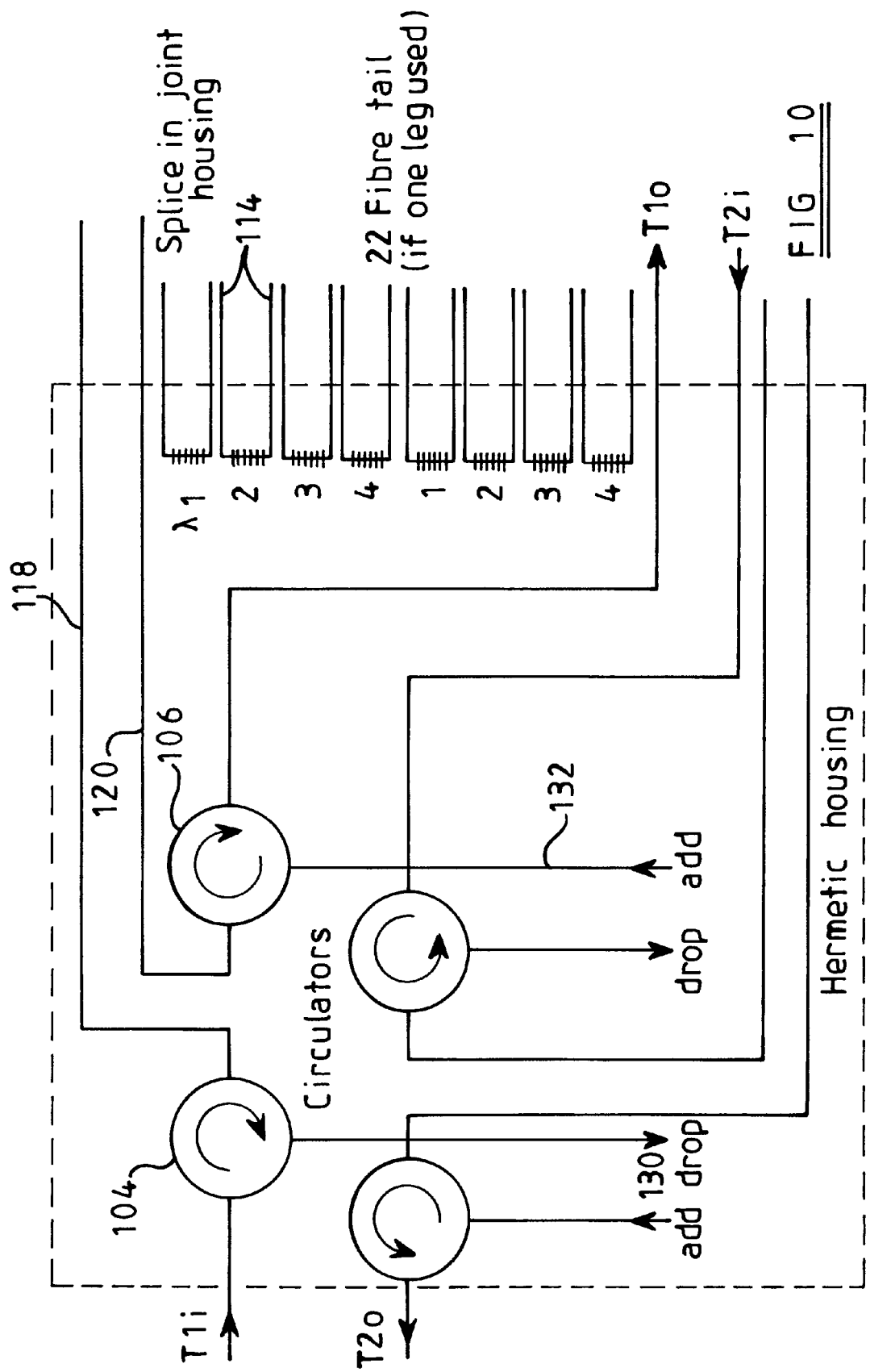

WAVELENGTH DIVISION MULTIPLEX BRANCHING UNIT AND METHOD OF OPERATION FOR OPTICAL TRANSMISSION SYSTEMS

This invention relates to branching units of wavelength division multiplex (WDM) optical transmission systems.

Optical transmission systems employing WDM have a trunk cable with pairs of optical fibres communicating with remote terminal stations. Traffic can be transmitted at a number of different wavelengths and branching units are provided in order to divert specific wavelength traffic from the trunk cable to a branch terminal station and to permit traffic to be added onto the trunk cable from the branch terminal at the same wavelength. WDM branching units can be configured to add and drop traffic at one or more wavelengths on different fibre pairs.

The increasing complexity of optical networks will result in systems having many branch terminals and requires these terminals to employ different add and drop wavelengths. Branching units are complex and expensive to manufacture and are currently produced specifically for a particular branch function in that they are provided with wavelength selective functions for dropping a specified wavelength to a branch and for permitting adding of traffic at that wavelength to the trunk. The optical properties of components employed in the branching unit including Bragg fibre gratings for wavelength selection are impaired by exposure to hydrogen, and hydrogen is produced in the vicinity of the housing in underwater systems as a result of electrolytic effects resulting from electrical current passing through the housing. The housing is hermetically sealed in the factory for such applications in order to prevent access of hydrogen and optical fibres communicate with the housing via a long coiled tail tube which contains a hermetic sealing medium.

Such a construction is not suitable for disassembly to change the wavelength selective functions by substitution of Bragg fibre gratings otherwise than under expert supervision in factory conditions where suitable testing facilities are also available. It is certainly not suitable for disassembly on board ship during a replacement operation. Accordingly, this presents a problem in the provision of spare units where the system contains a number of branching units performing different functions. Simple duplication of each branching unit type as a spare is expensive and may not be ideal in the event of a repeat replacement of the same unit in a high risk area of the sea bed.

The present invention seeks to provide what we call a universal or versatile spare branching unit which is readily adaptable to replace any variant of branching unit employed in a system.

According to the invention there is provided a wavelength division multiplex branching unit for an optical fibre transmission network, comprising a branching unit housing and means external to the housing for permitting the connection of one or more wavelength selective devices, each responsive to a different transmission wavelength, to a trunk transmission fibre so as to divert transmission signals having the response wavelength(s) of the connected device(s) from the trunk fibre to a spur fibre of a branch cable.

The branching unit housing may contain an optical circulator having a first port for connection to an input fibre of the trunk, a second port coupled with said means external to the main housing for permitting the connection of one or more wavelength selective devices which is/are responsive to reflect transmission wavelength(s) to be diverted and a third port for connection to a drop fibre of the branch cable.

The housing may contain a second optical circulator having a first port coupled with said means external to the main housing for permitting the connection of an opposite end of the wavelength selective device(s) a second port for connection to an output fibre of the trunk and a third port for connection to an add fibre of the branch cable. The wavelength selective devices may be Bragg fibre gratings.

The unit may comprise several wavelength selective devices each mounted so as to permit selective connection to a trunk fibre by said means external to the housing. The wavelength selective devices may be mounted in the branching unit housing. The wavelength selective devices may each be coupled to optical fibre tails and are routed together with the trunk transmission coupling fibre and drop wavelength selection fibres via a tail tube to a termination housing wherein selective coupling of one or more of the wavelength selecting devices to the trunk fibre can be effected by splicing selected fibre tails to the drop wavelength selection fibres. Alternatively, the wavelength selective devices are each coupled to optical fibre tails which are routed together with a trunk transmission fibre coupling and drop wavelength selection fibres some through each end of the housing via a tail tube to termination housings at opposite ends of the branching unit housing wherein selective coupling of one or more of the wavelength selecting devices to the trunk fibre can be effected by splicing selected fibre tails to the drop wavelength selection fibres. The selective coupling may be effected by splicing of fibres in the termination housing. The termination housing(s) may be located in the end of an armadillo flexible coupling provided one on each end of the housing.

The wavelength selective devices may be coupled via fibres of an optical fibre cable together with the trunk transmission fibre coupling and drop wavelength selection fibres to a remote joint box for joining with the trunk cable, wherein selective coupling of one or more of the wavelength selecting devices to the trunk fibre can be effected by splicing selected fibres associated with specific wavelength selective devices to the drop wavelength selection fibres. The wavelength selective devices may each be coupled to optical fibre tails and routed together with the trunk transmission coupling fibre and drop wavelength selection fibres via a tail tube to a termination housing which is joined to the optical fibre cable by splicing for coupling to the joint box. Alternatively, the wavelength selective devices may be shared between a pair of optical fibre cables extending from opposite ends of the branching unit housing and are routed together with one of the trunk transmission coupling fibres, and drop wavelength selection fibres to different remote joint boxes for joining with the trunk cable, wherein selective coupling of one or more of the wavelength selecting devices to the trunk fibre can be effected by splicing selected fibres associated with specific wavelength selective devices to the drop wavelength selection fibres. The wavelength selective devices are in this case each coupled to optical fibre tails and are routed together with a trunk transmission fibre coupling and drop wavelength selection fibres some through each end of the housing via a tail tube to termination housings at opposite ends of the branching unit housing and where each housing is joined to one of the pair of optical fibre cables by splicing for coupling to a different joint box.

The means external to the branching unit housing for permitting the connection of one or more wavelength selective devices man comprise means permitting selective replacement of wavelength selective devices. A housing may be mounted on one end of the branching unit housing and may have a receptor for such devices, which receptor is coupled via optical fibres to the trunk transmission fibre in the branching unit housing. Alternatively, the means permitting selective replacement of wavelength selective devices in the form of a receptor for such devices provided in the or each termination of the branching unit housing and is coupled via optical fibres through a tail tube to the trunk transmission fibre in the branching unit housing. In yet another alternative the means permitting selective replacement of wavelength selective devices is a receptor for such devices provided in one or both of a pair of joint boxes disposed remotely from opposite ends of the branching unit housing and coupled therewith via optical fibre cable the receptor being coupled to the trunk transmission fibre in the branching unit housing via optical fibres in the cable. The housing containing the wavelength selective devices may be hermetically sealed. The branching unit housing is normally hermetically sealed.

The invention also includes a method of selecting wavelengths to be dropped by a branching unit comprising selecting one or more wavelength selective devices and effecting connection to a transmission fibre in the housing by means of optical fibre connections accessed externally of the housing. Several different wavelength selective devices may be provided in the housing and selection of desired wavelengths effected by coupling of appropriate communicating optical fibres. The coupling may be effected in a termination for the housing or in a joint box for connection to the trunk cable. Coupling of appropriate communicating fibres may be affected by splicing.

An alternative method involves the coupling of one or more wavelength selective devices to the optical fibre connections externally of the housing.

Figure 2:
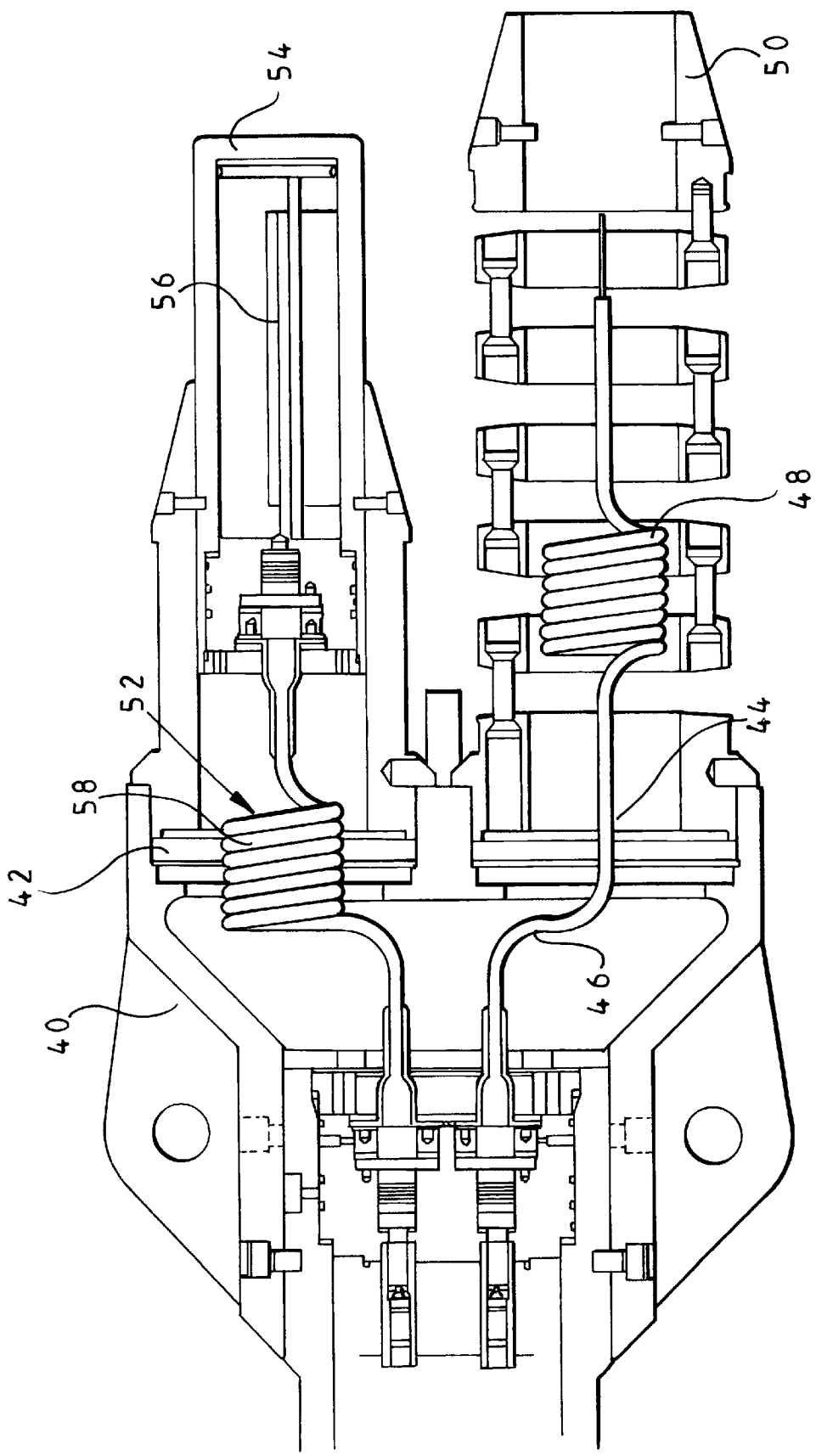
Figure 3:
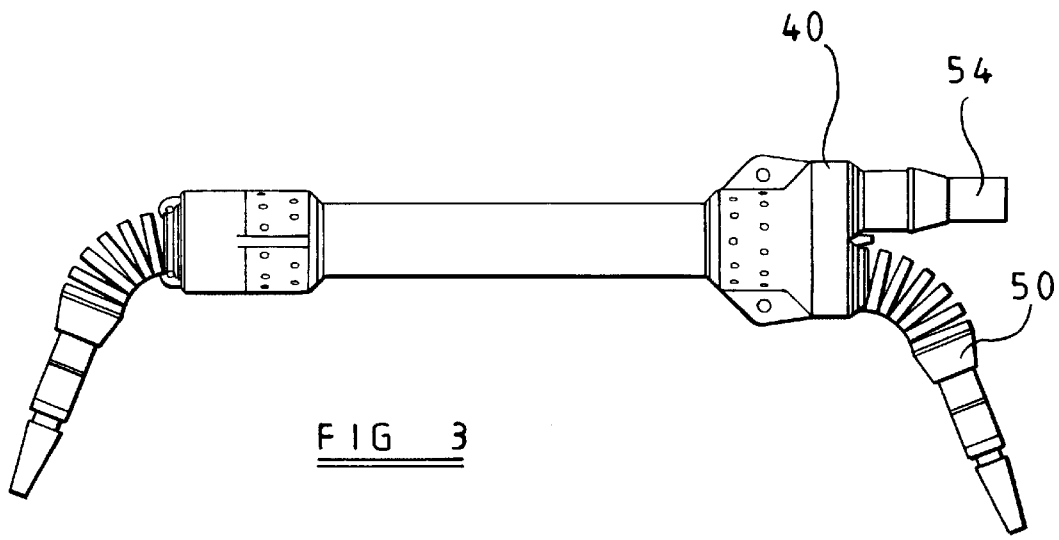
Figure 5:
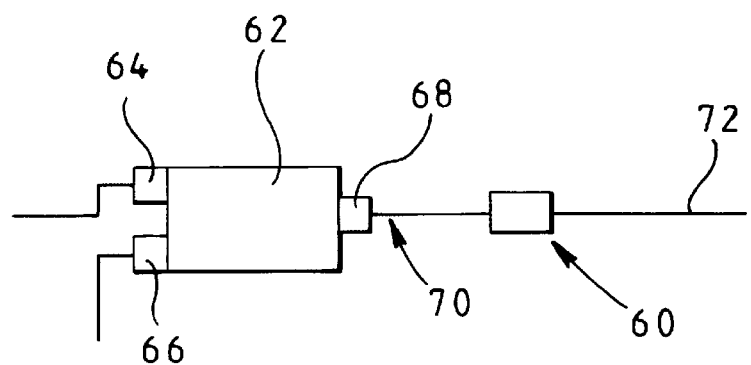
Figure 6:
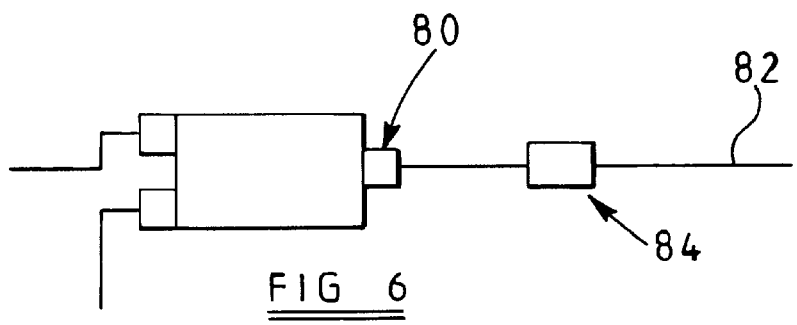
Figure 7:
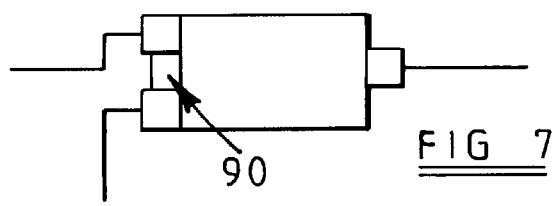
Figure 8:
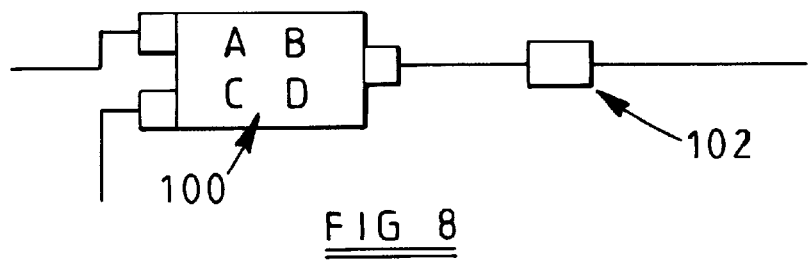
Figure 9:
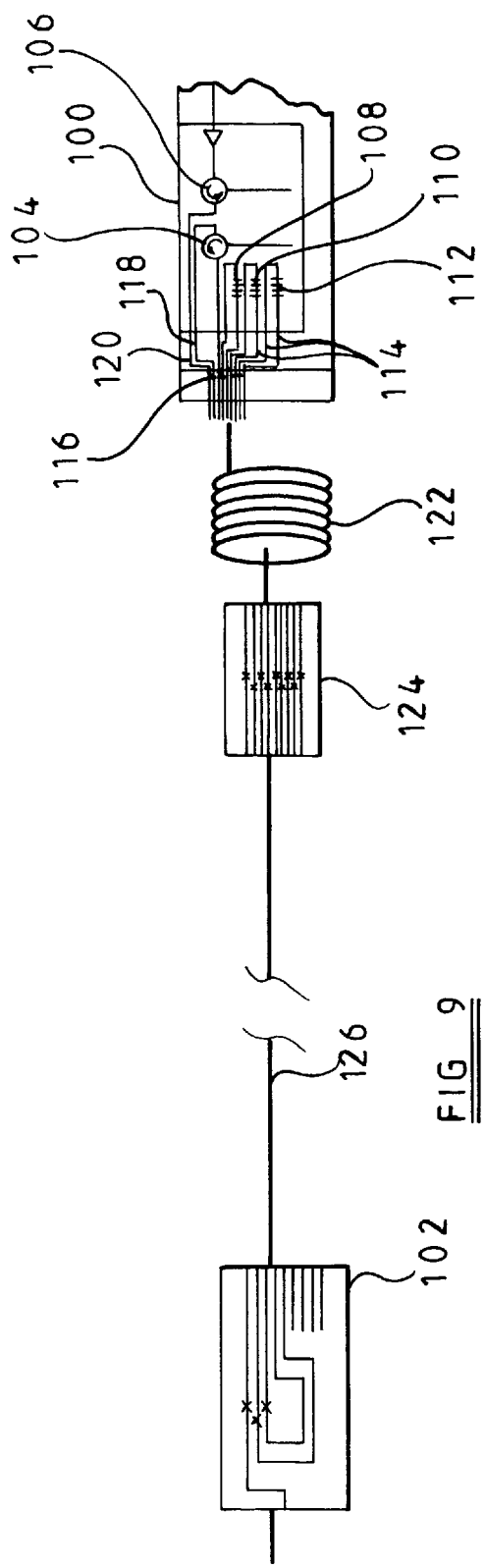
Figure 11:
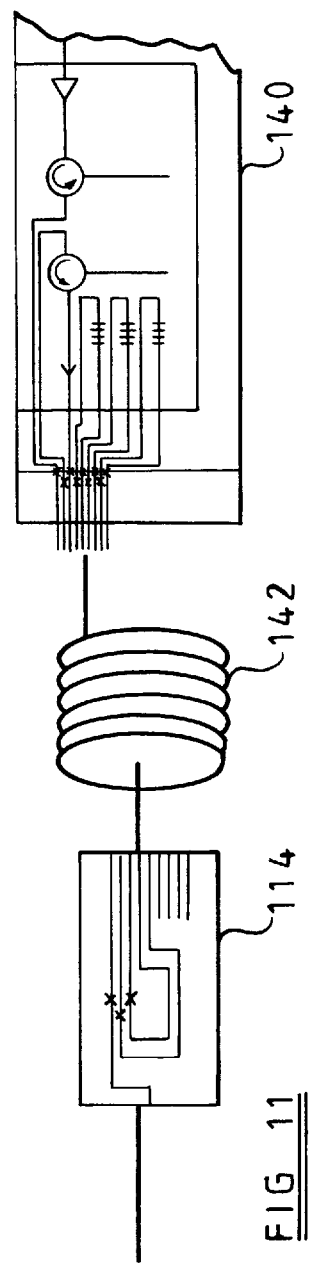

In order that the invention and its various other preferred features may be understood more easily, some embodiments thereof will now be described, by way of example only, with reference to the drawings, in which:

FIG. 1 illustrates schematically the operation of a basic WDM branching unit,

FIG. 2 is a cut away view showing one end of a branching unit constructed in accordance with the invention, FIG. 3 is a schematic side view of the branching unit of FIG. 2, FIG. 4 shows schematically the branching unit as compared with a transmission system containing branching units which it can replace, FIG. 5 illustrates schematically a branching unit in which Bragg fibre gratings are provided in a cable joint box, FIG. 6 illustrates schematically a branching unit in which the Bragg fibre gratings are provided in an external cable termination housing, FIG. 7 illustrates schematically an alternative housing arrangment for Bragg fibre gratings, FIG. 8 illustrates schematically a currently preferred option in which a set of gratings are housed within the main branching unit housing, FIG. 9 illustrates in more detail a specific arrangement of the embodiment of FIG. 8, FIG. 10 shows further detail of the configuration in the housing of FIG. 9, FIG. 11 shows yet another embodiment similar to FIG. 9 but employing splicing in the termination housing.

Referring now to FIG. 1 a branching unit 10 has a Bragg fibre grating 12 acting as a reflector for a specific wavelength channel $\lambda_1$ and is situated between two three port circulators 14, 16 acting as "exit by next port" devices. All channels from a western trunk fibre 18 enter the first port 20 of the circulator 14 and exit through the second port 22. The Bragg grating reflects $\lambda_1$ but allows all other channel wavelengths to pass into the first port 24 of the second circulator 16 and out through the second port 26 to the eastern trunk fibre 28. The reflected wavelength $\lambda_1$ enters the second port 22 of circulator 14 and exits at the third port 30 so that it is dropped via spur fibre 32 to a branch unit 34. The purpose of the second circulator 16 is to add a new traffic signal at wavelength $\lambda_1$ from the branch unit 34 via the spur add fibre 36, in the so called immediate wavelength reuse scheme, thereby re-creating the same set of trunk channels. A similar filtering optical arrangement is employed in the other direction. There may be a requirement that more than one channel wavelength is required to be dropped and added in which case Bragg gratings can be concatenated to reflect each of the required channel wavelengths.

It will be appreciated that the functionality of the branching unit, in so far as its capability of dropping and adding channel wavelengths is concerned, is determined by the Bragg gratings employed and in a hermetically sealed branching unit, such as employed in underwater systems, replacement otherwise than under controlled factory conditions is not practical. The present invention is concerned with the production of a branching unit which can be adapted to the requirements of any drop/add channel requirements of a system so that it can form a universal or versatile spare.

FIG. 2 shows one end of a branching unit housing 40 provided with a double entry hermetically sealed bulkhead 42 one entry 44 of which serves to provide the exit for trunk fibre 46 through a coiled tail tube 48, containing a hermetic sealant, via an armadillo which limits bending and protects the fibre. At the additional entry 52 there is mounted a pressure resistant housing 54, which forms a fourth leg of the housing, which is securable to the bulkhead and provided with hermetic seals. The housing has a mounting 56 for fibre gratings and fibre tails from the circulator ports to which the grating(s) are to be coupled are routed through a tail tube 58 into the housing. Sets of Bragg fibre gratings would be supplied with the unit and the required gratings would be selected and coupled to the fibre tails to adapt the spare to a specific requirement before deployment. On the assumption that Bragg Fibre Gratings are not available in a hermetic form it will be essential to ensure hermetic sealing of the housing. The overall mechanical arrangement of this four leg housing is shown in FIG. 3 where it should be noted that the two end bulkheads are disposed axially at 90° to one another.

FIG. 4 shows schematically a system having four branching units A, B, C, D which as can be seen have double entry bulkheads at one end and single entry bulkheads at the other and which are equipped internally with the required fibre grating. These can be compared with the universal spare housing E which has an additional double entry bulkhead with the additional housing 54 for containing fibre gratings chosen to suit a specific replacement requirement. Whilst this arrangement will provide a universal spare it does involve considerable practical problems in that the size shape and weight of the spare is different to that of the normal branching units, some considerable time and skill is required to prepare the spare and there is the difficulty of ensuring hermetic sealing of the additional housing and the non standard four leg main housing is difficult to handle and feed over a bow sleeve of the ship as all three armadillos lie off axis to the main housing.

There are a number of other options for location of gratings externally of the branching unit housing one is to provide the gratings inside a cable joint box as is illustrated in principle in FIG. 5. The cable joint box 60 is based on conventional practice where the branching unit housing 62 has three legs 64, 66, 68 and each leg has a length of optical fibre cable 70 such which extends to and is secured in a joint box such as 60 for splicing to the trunk cable 72 by conventional techniques. In the simplest case of add/drop at one wavelength on a single pair of fibres this requires two gratings to be provided in the joint box in addition to normal splices. A conventional joint box volume would accommodate up to 8 gratings. Gratings could be accommodated in the joint boxes provided on any of the three legs of the branching unit. Clearly additional fibres are required in the optical fibre cable between branching unit housing 62 and joint box e.g. the cable 70. Normally the joint box is not hermetically sealed. Whilst this arrangement is a practical proposition it does create the need for a hermetically sealed joint box, if the gratings themselves are not hermetically protected devices, in order to prevent ingress of hydrogen and degradation of performance. The box can be spaced between 30 and 80 metres from the housing, where the maximum hydrogen generation occurs, so that the effect of hydrogen generation on the gratings is reduced. The main disadvantages of this arrangement relate to the expertise required to fit gratings and ensure hermetic sealing in an installation environment.

The arrangement illustrated in FIG. 6 is similar to FIG. 5 in that it removes the fibre gratings to an external housing 80. In this case the gratings for all possible applications are pre-packed inside the housing of the termination (tail cable to sea cable) joint beneath the armadillo nose cone. The splices to bring the necessary gratings into action are then made via fibre loops to the tail joints when splicing the BU to the trunk cable 82 into the system at the joint box 84. Again a similar arrangement is possible at any of the three legs of the housing. This is an attractive option in terms of ease of installation, in that jointers need only make some extra splices and the ship will handle a spare which is mechanically identical with the system units.

A slight disadvantage against the previous option is that more gratings need to be packaged inside the joint and the fibre count in the cable becomes very high where the replaced BU has a complicated function.

The major disadvantage it shares with the previous option is the need for hermeticity of the termination joint. In this case the joint will lie much closer to the point of maximum hydrogen generation.

A sub-option of this approach would be for the gratings to be placed inside the termination at the time of shipboard jointing. This would reduce the number of gratings, but it would also mean extra moulding operations during the repair to encapsulate the termination joint. Recent Installation policy has been to avoid repeater to sea cable jointing by placing pre-tailed spare repeaters on board vessels.

FIG. 7 shows an alternative housing option for the gratings. It is similar in principle to that of FIGS. 2 to 4, in that it places a separate mini-housing 90 for the gratings outside the main component housing on the body of the branching unit. Whereas FIG. 2 suffers from this extra housing taking the form of a protuberance on the fourth leg, this option retains a three-leg unit by accommodating the housing 90 within the cavity of the end-piece at the branched end. The penalty paid for this neater arrangement is the need for a new three-entry bulkhead at the branched end to bring out fibres from the circulators, in addition to the two cable terminations. This creates difficulties on both sides of the bulkhead.

Whilst this option has the advantage of a standard shaped housing as the spare and may be less vulnerable to hydrogen (i.e. screened by the housing), the engineering effort required for the development of special internal handling, bulkhead, end-piece and mini-housing, together with the previous shipboard skills argument, probably outweigh these advantages.

It will be clear from the discussion of the previous embodiment that a major problem results when gratings have to be housed outside the main branching unit housing. A preferred embodiment is illustrated schematically in FIG. 8 and follows the logic that the fibre gratings A, B, C, D, are key components of the branching unit and are most safely housed undisturbed in the main branching unit housing 100 which is hermetically sealed and fully tested in the factory. For universal spare capability this means that gratings suitable for all add/drop branching unit requirements of a system must be accommodated in the main housing.

Additional fibres are required in the armoured tail cable to loop splices out to a joint housing 102 at which appropriate splices can be made during installation of the spare to connect required gratings between the circulators. Such fibres can be routed to any one or more of the joint housings on any of the three legs and with a complex spare requirement all three joint boxes may be required.

FIG. 9 shows a more detailed specific arrangement of the embodiment of FIG. 8 and for simplicity shows a single trunk fibre for one direction of transmission. It will be appreciated that there will normally be at least two trunk fibres for two way transmission. It can be seen that the housing 100 contains two circulators 104, 106 and three fibre gratings 108, 110, 112. Opposite ends of each fibre grating are each routed via an optical fibre tail 114 together with the main trunk through fibre tail connection 116 and circulator coupling tails 118, 120 out of the hermetic housing through a coiled tail tube 122, containing a hermetic sealing compound, to a termination housing 124. The fibre tails in the termination housing are then spliced at X to fibres of a cable tail 126 of 30 to 80 metre length by which they are routed to the joint box 102. In the joint box appropriate splices at X are made to loop back a connection of a selected fibre grating to connect between the circulators 104, 106. A number of fibre gratings can be spliced in concatenated fashion to provide additional drop wavelengths. Alternatively, concatenated grating arrangements for specified branching units can be provided in the housing 100 and provided with appropriate fibre tails for selection at the joint box.

FIG. 10 shows in more detail the configuration inside the housing of FIG. 9 for a two direction single pair of fibres in the trunk and add/drop at a single wavelength. Outbound traffic is routed from an input T1i to one of a pair of circulators 104, 106 which each have a port coupled via tails 118, 120 to the splice joint housing. Four gratings 1, 2, 3, 4, are coupled also to the splice joint housing by pairs of fibre tails 114. By appropriate splicing at the joint housing a selected one of the gratings can be connected between the two circulators to reflect a particular wavelength back into the circulator 104 so that it exits down the drop fibre 130. Similarly, an add fibre 132 can introduce a signal at the wavelength of the selected grating which wavelength enters the first port of the circulator 106, exits at the second port where it is reflected back into the circulator by the grating and eventually exits from the third port on the line T1o to the splice joint housing at which it is spliced to the trunk fibre. A similar configuration and operation is involved for the inbound traffic at input T2i through to output T2o. As can be seen a tail including 22 fibres is required for such a configuration if provided at a splice joint housing on a single leg. This arrangement is very practical and has the installation advantage that the spare has identical dimensions to the original system units and requires no special training of installers who are familiar with splicing in joint housings. Only a specified menu of splicing is required to adapt the spare to the desired wavelength function.

Another feature of this option is that the spare unit may be fully tested at all its possible wavelengths prior to leaving the factory. The shipboard testing to verify its performance prior to deployment would then be a check on fibre splices only since the fibre gratings will remain undisturbed in the operation.

The main disadvantages with this system are the number of gratings to be housed in the main housing and the space they occupy, the number of fibres in the trunk cable with the requirement for a suitable sealing gland, and the high splice count and associated attenuation of signal resulting therefrom. The gland sealing problem may be facilitated by sharing fibres between legs whilst the attenuation loss can be minimised by careful selection and matching of fibre types.

Another possible constructions is shown in FIG. 11 where the branching unit housing 140 construction and tail tube arrangement 142 is similar to that of FIG. 9 in that the housing contains a full range of different wavelength gratings for selection but in this case the selection of gratings is effected in the termination housing by splicing. Whilst this arrangement reduces the number of splices and so reduces the attenuation resulting therefrom it requires access to the termination housing during or prior to installation which it is preferred to avoid due to lack of familiarity of installing personnel.

What is claimed is:

1. A wavelength division multiplex branching unit for an optical fibre transmission network, comprising a branching unit housing and connecting means external to the housing for permitting the connection of one or more wavelength selective devices, each responsive to a different transmission wavelength, to a trunk transmission fibre so as to divert transmission signals having the response wavelength(s) of the connected device(s) from the trunk fibre to a drop fibre of a branch cable.

2. A branching unit as claimed in claim 1, comprising several wavelength selective devices each mounted so as to permit selective connection to a trunk fibre by said connecting means external to the housing.

3. A branching unit as claimed in claim 2, wherein the wavelength selective devices are mounted in the branching unit housing.

4. A branching unit as claimed in claim 3, wherein the wavelength selective devices are each coupled to optical fibre tails which are routed together with a trunk transmission coupling fibre and drop wavelength selection fibres via a tail tube to a termination housing wherein selective coupling of one or more of the wavelength selecting devices to the trunk fibre can be effected by splicing selected fibre tails to the drop wavelength selection fibres.

5. A branching unit as claimed in claim 4, wherein the connecting means external to the branching unit housing for permitting the connection of one or more wavelength selective devices comprises mounting means permitting elective replacement of wavelength selective devices.

6. A branching unit as claimed in claim 5 wherein the wavelength selective devices are Bragg fibre gratings.

7. A branching unit as claimed in claim 6, wherein a housing mounted on one end of the branching unit housing has the mounting means permitting selective replacement of wavelength selective devices in the form of a receptor for such devices, which receptor is coupled via optical fibres to the trunk transmission fibre in the branching unit housing.

8. A branching unit as claimed in claim 6, wherein the mounting means permitting selective replacement of wavelength selective devices is a receptor for such devices provided in the or each termination of the branching unit housing and is coupled via optical fibres through a tail tube to the trunk transmission fibre in the branching unit housing.

9. A branching unit as claimed in claim 6, wherein the mounting means permitting selective replacement of wavelength selective devices is a receptor for such devices provided in one or both of a pair of joint boxes disposed remotely from opposite ends of the branching unit housing and coupled therewith via optical fibre cable the receptor being coupled to the trunk transmission fibre in the branching unit housing via optical fibres in the cable.

10. A branching unit as claimed in claim 4, wherein the termination housing is located in the end of an armadillo flexible coupling provided one on an end of the housing.

11. A branching unit as claimed in claim 4, wherein the selective coupling is effected by splicing of fibres in the termination housing.

12. A branching unit as claimed in claim 3, wherein the wavelength selective devices are each coupled to optical fibre tails which are routed together with a trunk transmission fibre coupling and drop wavelength selection fibres some through each end of the housing via a tail tube to termination housings at opposite ends of the branching unit housing wherein selective coupling of one or more of the wavelength selecting devices to the trunk fibre can be effected by splicing selected fibre tails to the drop wavelength selection fibres.

13. A branching unit as claimed in claim 12 wherein the selective coupling is effected by splicing of fibres in the termination housing.

14. A branching unit as claimed in claim 13 wherein the termination housings are located in the end of an armadillo flexible coupling provided one on each end of the housing.

15. A branching unit as claimed in claim 3, wherein the wavelength selective devices are each coupled via fibres of an optical fibre cable together with the trunk transmission coupling fibre and drop wavelength selection fibres to a remote joint box for joining with a trunk cable, wherein selective coupling of one or more of the wavelength selecting devices to the trunk fibre can be effected by splicing selected fibres associated with specific wavelength selective devices to the drop wavelength selection fibres.

16. A branching unit as claimed in claim 15, wherein the wavelength selective devices are each coupled to optical fibre tails and routed together with the trunk transmission coupling fibre and drop wavelength selection fibres via a tail tube to a termination housing which is joined to the optical fibre cable by splicing for coupling to the joint box.

17. A branching unit as claimed in claim 3, wherein the wavelength selective devices are shared between a pair of optical fibre cables extending from opposite ends of the branching unit housing and are routed together with one of the trunk transmission coupling fibres, and drop wavelength selection fibres to different remote joint boxes for joining with the trunk cable, wherein selective coupling of one or more of a wavelength selecting devices to the trunk fibre can be effected by splicing selected fibres associated with specific wavelength selective devices to the drop wavelength selection fibres.

18. A branching unit as claimed in claim 17, wherein the wavelength selective devices are each coupled to optical fibre tails and are routed together with a trunk transmission coupling fibre and drop wavelength selection fibres some through each end of the housing via a tail tube to termination housings at opposite ends of the branching unit housing and where each housing is joined to one of the pair of optical fibre cables by splicing for coupling to a different joint box.

19. A branching unit as claimed in claim 3 wherein the branching unit housing is hermetically sealed.

20. A branching unit as claimed in claim 1, wherein the branching unit housing contains an optical circulator having a first port for connection to an input fibre of the trunk, a second port coupled with said connecting means external to the main housing for permitting the connection of one or more wavelength selective devices which is/are responsive to reflect transmission wavelength(s) to be diverted and a third port for connection to a drop fibre of the branch cable.

21. A branching unit as claimed in claim 20, wherein the housing contains a second optical circulator having a first port coupled with said connecting means external to the main housing for permitting the connection of an opposite end of the wavelength selective device(s) a second port for connection to an output fibre of the trunk and a third port for connection to an add fibre of the branch cable.

22. A branching unit as claimed in claim 21 wherein the wavelength selective devices are Bragg fibre gratings, and there are several Bragg fibre gratings each mounted in the branching unit housing so as to permit selective connection to a trunk fibre by said connecting means external to the housing.

23. A branching unit as claimed in claim 1, wherein the wavelength selective devices are Bragg fibre gratings.

24. A branching unit as claimed in claim 1, wherein the housing containing the wavelength selective devices is hermetically sealed.

25. A method of selecting transmission wavelengths to be dropped by a branching unit having a housing, comprising selecting one or more wavelength selective devices and effecting connection of the one or more selected wavelength selective devices to a transmission fibre in the housing by means of optical fibre connections accessed externally of the housing.

26. A method as claimed in claim 25, wherein several different wavelength selective devices are provided in the housing and selection of desired wavelengths is effected by coupling of appropriate optical fibres communicating with the selected wavelength selective devices.

27. A method as claimed in claim 26, wherein the coupling is effected in a termination for the housing.

28. A method as claimed in claim 26, wherein the coupling is effected in a joint box for connection to a trunk cable.

29. A method as claimed in claim 26 wherein coupling of optical fibres communicating with the selected wavelength selective devices is effected by splicing.

30. A method as claimed in claim 25, wherein one or more wavelength selective devices are coupled to the optical fibre connections externally of the housing.

* * * * *

UNITED STATES PATENT AND TRADEMARK OFFICE
CERTIFICATE OF CORRECTION

PATENT NO. : 6,115,516  
DATED : September 5, 2000  
INVENTOR(S) : Ian Gerard Watson et al.

It is certified that error appears in the above-identified patent and that said Letters Patent is hereby corrected as shown below:

Title page,  
Insert item [30] Foreign Application Priority Data, May 12, 1997 (UK) ........9609611.9

Item [56] under References Cited, the following should appear:  
FOREIGN PATENT DOCUMENTS  
0720408      3/96     (EP)  
97/06617     1/90     (WO)

OTHER PUBLICATIONS  
MIZUOCHI, T. ET AL: "ALL-FIBER ADD/DROP MULTIPLEXING OF 6 X 10 GBIT/S USING A PHOTO-INDUCED BRAGG GRATING FILTER FOR WDM NETWORKS", OPTICAL FIBER COMMUNICATION (OFC) 1996, SAN JOSE, FEB. 25—MAR. 1, 1996 col. 2, no. Cong. 19, 25 February 1996, page 116/117. XP000620996, OPTICAL SOCIETY OF AMERICA.

JONES, K.P, ET AL: "OPTICAL WAVELENGTH ADD-DROP MULTIPLEXER IN INSTALLED SUBMARINE WDM NETWORK" ELECTORNICS LETTERS, vol 31, no. 24, 23 November 1995, page 2117/2118, XP000548194.

TACHIKAWA Y. ET AL: "TUNABLE WDM-CHANNEL GROUP DROP FILTERS BASED ON A SMART DEVICE COFIGURATION", ELECTRONICS LETTERS, vol. 31, no. 23, 9 November 1995, page 2029/2030, XP000546741.

JUMA, S.K. ET AL.: "IMPACT OF PHASE MASK TECHNIQUE IN GUIDED WAVE DEVICE PRODUCTION:, PROCEEDINGS OF THE SPIE,vol. 2997, 12 February 1997, pages 284-295, XP000199081, page 288-291, figs. 3-7.

SASAYAMA, K. ET AL: "PHOTONIC FREQUENCY-DIVISION-MULTIPLEXING HIGHWAY SWITCH USING INTEGRATED-OPTIC MULTIPLE RING RESONATORS" IEICE TRANSACTIONS ON COMMUNICATIONS, vol. E78-B, no. 5, 1 May 1995, pages 674-678, XP000513466, abstract, figs. 1-7.

UNITED STATES PATENT AND TRADEMARK OFFICE
CERTIFICATE OF CORRECTION

PATENT NO. : 6,115,516
DATED : September 5, 2000
INVENTOR(S) : Ian Gerard Watson et al.

It is certified that error appears in the above-identified patent and that said Letters Patent is hereby corrected as shown below:

Column 7,
Line 60, "elective" should be -- selective --.

Column 8,
Line 26, before "coupling", "fibre" should be deleted and after "coupling", -- fibre -- should be inserted.

Signed and Sealed this

Eleventh Day of December, 2001

*Attest:*

NICHOLAS P. GODICI
*Attesting Officer*  *Acting Director of the United States Patent and Trademark Office*